United States Patent Office 3,702,341
Patented Nov. 7, 1972

3,702,341
METHOD OF RECOVERING LYSINE FROM A FERMENTATION BROTH
Moriyoshi Ishida and Terutsugu Hori, Kawasaki, Kanagawa-ken, Yuzuru Otsuka, Tokyo, Kunimitsu Sato, Kawasaki, Katsuyuki Inoue, Yokohama, and Yoshio Ogata, Kawasaki, Kanagawa-ken, Japan, assignors to Ajinomoto Co., Inc., Tokyo, Japan
No Drawing. Filed Jan. 19, 1970, Ser. No. 4,109
Claims priority, application Japan, Feb. 3, 1969, 44/7,990
Int. Cl. C07c 99/02
U.S. Cl. 260—527 N                5 Claims

ABSTRACT OF THE DISCLOSURE

Lysine can be recovered from fermentation broths containing the same by adjusting the pH to 3–7 with hydrogen chloride and making the broth supersaturated with lysine monohydrochloride dihydrate, if the original broth meets the requirements that the weight ratio X of lysine to total solids is at least 0.32, and that the mol ratio Y of added hydrogen chloride to lysine in the adjusted broth satisfies the condition that XY is at least 0.32. The recovered lysine monohydrochloride dihydrate is practically pure and may be further purified or converted to other forms of lysine.

---

This invention relates to the recovery of lysine. More particularly, this invention relates to a process for separating lysine from an untreated or treated lysine fermentation broth obtained by culturing in a culture medium a microorganism capable of producing and accumulating lysine.

There have been proposed methods for recovering lysine from its aqueous solution, in the form of its salt sparingly soluble in water, by solvent extraction, or by adsorption on ion-exchange material.

These methods have some disadvantages from the industrial point of view and are troublesome.

It has now been found that lysine can be crystallized as lysine monohydrochloride dihydrate, hereinafter referred to as Lys.HCl.2H$_2$O in a very simple way and in a high yield from a lysine fermentation broth satisfying some specific conditions.

Such a broth is a very complex system containing many kinds of impurities, especially many kinds of anions corresponding to the lysine cations, amphoteric compounds which behave in a complex way, depending on the pH and other conditions, and high molecular compounds. Even if an acid other than hydrochloric acid, such as sulfuric or acetic acid, is added to such an impure and complex system, no corresponding lysine salt can be crystallized direct.

The process of this invention is a process for separating lysine which comprises (a) adjusting with hydrochloric acid to between 3 and 7 the pH of an untreated or treated lysine fermentation broth satisfying some specific conditions which will be specified hereinafter, (b) concentrating and/or (c) cooling the adjusted broth, whereby Lys.HCl.2H$_2$O is crystallized and (d) separating the crystals from the liquid remainder. I.e., the process of this invention can be applied only to certain broths. In more detail, an untreated or treated lysine fermentation broth to which the process is applicable must satisfy the two conditions:

(1) $X \geq 0.32$ and (2) $XY \geq 0.32$ wherein X represents the weight ratio of the lysine (as free state) to the total solid content in the broth and Y represents the mole ratio of the hydrogen chloride value to the lysine value in the broth adjusted in its pH to within a range of between 3 and 7 with hydrochloric acid.

Some examples of a lysine fermentation broth from which lysine can be successfully separated in accordance with the process of this invention are:

(1) An untreated lysine fermentation broth which is obtained by culturing in a culture medium a microorganism capable of producing and accumulating lysine, such as a lysine-producing mutant belonging to species Brevibacterium flavum or Brev. lactofermentum (U.S. pat. applns. Ser. Nos. 644,787 and 699,807).

(2) A treated lysine fermentation broth which is obtained by removing the bacterial cells from an untreated broth as referred to under (1) above by filtering, by centrifuging, or by coagulating followed by decanting;

(3) Another treated lysine fermentation broth which is obtained by further treating a cell-free broth as referred to under (2) above, i.e., by clearing such a cell-free broth with the aid of a high molecular cohering agent, an adsorbent or a filter aid such as processed diatomaceous earth.

The total solid content in a broth consists of lysine and other metabolites produced by the employed lysine-producing microorganism or the denatured substances thereof, bacterial cells, residual nutrients, and impurities originating from the nutrients. In other words, it comprises water soluble and insoluble substances such as lysine and other amino acids, saccharides, peptides, protein, polysaccharides, inorganic salts, growth promoting substances for the microorganism, resinous substances, and coloring materials. The weight of the total solid content is determined by subtracting from the weight of the concerned untreated or treated broth that of the water measured by the Karl Fischer's method.

The aforesaid condition $XY \geq 0.32$ indicates that the amount of hydrochloric acid required to convert the lysine value contained in the broth into the monohydrochloride can be defined as a function of X. Some broths are sharply decreased in their pH value to 3 or less, because of the impurities present therein, by the addition of a far smaller amount of hydrochloric acid than is necessary to convert the lysine value into the monohydrochloride, and the lysine value cannot be crystallized as Lys.HCl.2H$_2$O, because the solubility of the lysine salt is very great in the broths so adjusted. Such broths are excluded from the process of the invention.

Accordingly, the process of this invention cannot be successfully applied to those untreated or treated broths which do not satisfy the aforesaid two conditions, such as broths containing a small lysine value resulting from unsuccessful fermentation or broths containing a large lysine value but having unfavourable properties resulting from the employed raw materials for fermentation such as molasses because molasses originally contain large amounts of impurities. E.g., a cane molasses containing about 50% by weight of sugars contains also 25–30% by weight of impurities as the solid content other than sugars. For this reason, a lysine fermentation broth obtained by employing cane molasses as the main carbon source for fermentation contains usually impurities in an amount of twice the weight of the lysine, and does not satisfy the condition $X \geq 0.32$. Nor does such a broth satisfy the condition $XY \geq 0.32$, because the impurities comprise a large amount of sulfate ions preventing the formation of Lys.HCl.2H$_2$O. A lysine fermentation broth obtained by employing beet molasses as the main carbon source has the same properties as a cane molasses-fermented broth, and cannot be dealt with successfully by the process of this invention.

The amount of hydrochloric acid to be added to a broth satisfying the two conditions depends primarily upon the pH value intended by the addition, which value must be within a range between 3 and 7. When the pH value of the broth is adjusted to within this range, the hydrochloric acid added is usually in an amount almost equal to the moles of the lysine contained in the broth. At a pH value outside the range, the solubility of the lysine hydrochloride is too great. Concentrated hydrochloric acid is favourably employed. Hydrogen chloride gas can, however, be used in place of it and the term "hydrochloric acid" shall cover hydrogen chloride gas in the process of this invention.

From an untreated or treated broth adjusted in its pH value to within the aforesaid range $Lys.HCl.2H_2O$, may be crystallized by any conventional means for crystallizing a solute from a supersaturated solution. Examples of such conventional means are concentrating, cooling, seeding or combinations thereof. Immediately after $Lys.HCl.2H_2O$ has been crystallized or after the resulting crystals have grown to a suitable size, the crystals are separated from the mother liquid by centrifuging, filtering or combinations thereof.

The crystals obtained are very pure and can be used for various purposes as they are or after being further purified.

The invention is further illustrated but not limited by the following examples.

EXAMPLE 1

A lysine-producing mutant ATCC No. 21129 belonging to species Brev. flavum was cultured in a cuture medium containing starch sugar as the main carbon source, and the bacterial cells were separated from the resulting fermentation broth. 12.7 l. of the cell-free broth (a lysine concentration of 3.31 g./dl., $X=0.34$) was mixed with hydrochloric acid to a pH value of 3.9. The XY value was 0.33 after pH adjustment. The mixture was concentrated to 1800 g. under reduced pressure and then cooled to 20° C. in 6 hours. After it had been stirred overnight, the resulting crystalline solid was separated with a centrifuge.

The undried solid weighed 254 g. and contained 96.8% by weight of $Lys.HCl.2H_2O$.

EXAMPLE 2

The same lysine-producing mutant as used in Example 1 was cultured in a culture medium containing crude sugar as the main carbon source, and the bacterial cells were separated from the resulting fermentation broth.

11.5 l. of the cell-free broth (a lysine concentration of 3.43 g./dl., $X=0.38$) was mixed with hydrochloric acid to a pH value of 4.2. The XY value was 0.42 after pH adjustment. The mixture was concentrated under reduced pressure to 1540 g. and then cooled to 20° C. in 6 hours. After it had been stirred overnight, the resulting crystalline solid was separated with a centrifuge.

The undried solid weighed 310 g. and contained 97.6% by weight of $Lys.HCl.2H_2O$.

EXAMPLE 3

From a lysine fermentation broth obtained by culturing the same lysine-producing mutant as used in Example 1 in a culture medium containing acetic acid as the main carbon source, the bacterial cells were separated.

6.3 l. of the cell-free broth (a lysine concentration of 5.46 g./dl., $X=0.49$) was mixed with hydrochloric acid to a pH value of 3.6. The XY value was 0.48 after pH adjustment. The mixture was concentrated under reduced pressure to 1076 g. and then cooled to 21° C. in 6 hours. After it had been stirred overnight, the resulting crystalline solid was separated with a centrifuge.

The undried solid weighed 291 g. and contained 98.7% by weight of $Lys.HCl.2H_2O$.

EXAMPLE 4

From a lysine fermentation broth obtained by culturing the same lysine-producing mutant as used in Example 1 in a culture medium containing acetic acid as the main carbon source, the bacterial cells were separated.

7.1 l. of the cell-free broth (a lysine concentration of 5.03 g./dl., $X=0.39$) was mixed with hydrochloric acid to a pH value of 4.0. The XY value was 0.35 after pH adjustment. The mixture was concentrated under reduced pressure to 1150 g. and then cooled to 23° C. in 4 hours. After a 2-hours stirring, the resulting crystalline solid was separated by centrifuging.

The undried solid weighed 339 g., and contained 97.9% by weight of $Lys.HCl.2H_2O$.

What is claimed is:

1. A method of recovering lysine values from an aqueous lysine fermentation broth containing enough lysine to make the weight ratio X of lysine to total solids in the broth at least equal to 0.32 which comprises:
   (a) adjusting said broth to a pH value between 3 and 7 with hydrogen chloride,
      (1) said broth being in a condition prior to said adjusting that the mole ratio Y of said hydrogen chloride to said lysine after said adjusting satisfies the condition that $XY \geq 0.32$;
   (b) crystallizing lysine monohydrochloride dihydrate from the adjusted broth; and
   (c) substantially separating said lysine monohydrochloride dihydrate in crystalline form from residual liquid.

2. A method as set forth in claim 1 wherein the weight of said total solids is defined as the weight of said broth minus the weight of water therein as determined by Karl Fischer's method.

3. A method as set forth in claim 2, wherein said lysine monohydrochloride dihydrate is crystallized from said adjusted broth by making said adjusted broth supersaturated with said lysine monohydrochloride dihydrate.

4. A method as set forth in claim 3, wherein said adjusted broth is made supersaturated by partly evaporating the same.

5. A method as set forth in claim 3, wherein said adjusted broth is made supersaturated by cooling the same.

References Cited
UNITED STATES PATENTS

| | | | |
|---|---|---|---|
| 2,929,839 | 3/1960 | Hoglan | 260—527 |
| 3,087,863 | 4/1963 | Lee et al. | 260—527 |
| 2,796,434 | 6/1959 | Fike | 260—527 |

VIVIAN GARNER, Primary Examiner